No. 731,395. PATENTED JUNE 16, 1903.
B. H. THWAITE.
METHOD OF CLEANSING FANS OPERATING ON BLAST FURNACE GASES.
APPLICATION FILED SEPT. 23, 1901.
NO MODEL.
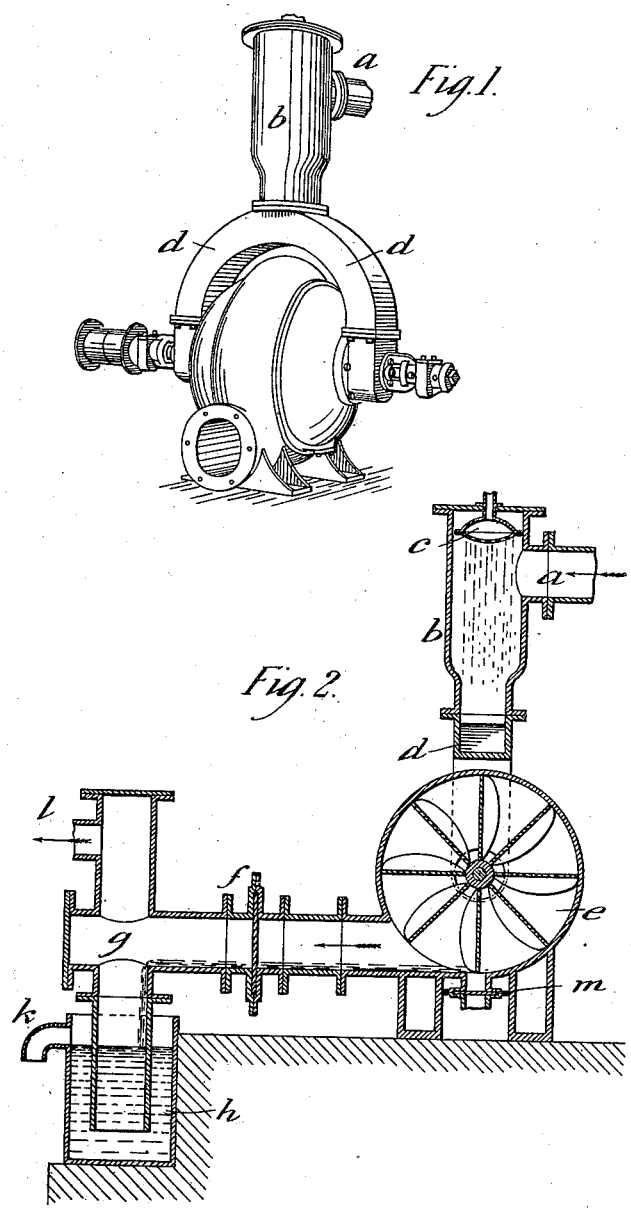
Witnesses:
Inventor
Benjamin H. Thwaite
By
James L. Norris.
Atty.

No. 731,395. Patented June 16, 1903.

UNITED STATES PATENT OFFICE.

BENJAMIN H. THWAITE, OF WESTMINSTER, ENGLAND, ASSIGNOR TO THE BLAST FURNACE POWER SYNDICATE, LIMITED, OF WESTMINSTER, ENGLAND.

METHOD OF CLEANSING FANS OPERATING ON BLAST-FURNACE GASES.

SPECIFICATION forming part of Letters Patent No. 731,395, dated June 16, 1903.

Application filed September 23, 1901. Serial No. 76,232. (No model.)

*To all whom it may concern:*

Be it known that I, BENJAMIN HOWARTH THWAITE, a citizen of England, residing at 29 Great George street, Westminster, in the county of London, England, have invented a certain new and useful Method of Cleansing Fans Operating on Blast-Furnace Gases, (for which I have applied for a patent in Great Britain, dated February 27, 1901, No. 4,225,) of which the following is a specification.

The fans employed for drawing or forcing blast-furnace gases are apt to have their blades thickly coated with deposit of lime and other earthy matters, which deposit greatly interferes with the efficiency of the fan. My invention relates to means of preventing and removing such deposit, for which purpose I admit water into the fan along with the gases, which water after passing through the fan and taking with it much of the matters that would otherwise become deposited is allowed to separate itself from the gases and flow away by a trap or water seal. When notwithstanding such constant washing there is serious deposit within the fan, I close its outlet for a time, and while it is partly or wholly filled with water I cause the blades to revolve in the water, thereby washing the deposit from them. In order to carry this method of cleansing conveniently into effect, the fan and its connections may be arranged as I shall describe, referring to the accompanying drawings.

Figure 1 is a perspective view of the fan, and Fig. 2 is a longitudinal section of the fan and its pipe connections.

$a$ is the inlet for the blast-furnace gases into a chamber $b$, in which water descends in a shower from a distributing-nozzle $c$. The gases and water descend by both branches $d$ of an arched conduit to the fan, which they enter at its central part. They pass when a sluice-valve $f$ is open to a vertical pipe $g$, where the water separates from the gases, the water descending into the receptacle $h$, where it forms a seal and whence it passes by an overflow $k$, while the gases flow away by a pipe $l$. At the bottom of the fan-case is an outlet-pipe provided with valve $m$. At times the valve $f$ is closed, as shown, and the fan-blades are caused to revolve with more or less water in the case, and after a time this, with the matters suspended in it, is run off by opening the valve $m$.

It will be evident that my improved method for cleansing fans employed in the delivery of furnace-gases consists in passing sprayed water into the fan-casing simultaneously with the admission of the gases, thereby absorbing and carrying off in suspension the solid matter deposited by the gases on the fan and in intermittently closing the outlet of the water after it leaves the fan-casing, by reason of which the level of the water is raised in said casing until the fan rotates partially or wholly immersed in water and is thereby cleansed by means of the solution in such casing and partly by the mechanical attrition of the deposit.

Having thus described the nature of this invention and the best means I know of carrying the same into practical effect, I claim—

The herein-described method of cleansing fans employed in delivering furnace-gases which consists in passing sprayed water into the fan-casing simultaneously with the admission of the gases thereby absorbing and carrying off in suspension solid matter deposited by the gases on the fan and in intermittently closing the outlet of the water after it leaves the fan-casing, whereby the level of the water is raised in the said casing until the fan rotates partially or wholly immersed in water and is thereby cleansed by means of the solution in said casing and partly by the mechanical attrition of the deposit.

In testimony whereof I have hereunto set my hand in presence of two subscribing witnesses.

B. H. THWAITE.

Witnesses:
GERALD L. SMITH,
EDWARD GARDNER.